United States Patent [19]

McLaughlin et al.

[11] 4,143,014

[45] Mar. 6, 1979

[54] NOVEL COMPOSITIONS

[75] Inventors: Alexander McLaughlin, Meriden; Harold E. Reymore, Jr., Wallingford; Reinhard H. Richter, North Haven, all of Conn.

[73] Assignee: The Upjohn Company, Kalamazoo, Mich.

[21] Appl. No.: 849,859

[22] Filed: Nov. 9, 1977

[51] Int. Cl.² .................. B32B 13/12; C08G 18/76
[52] U.S. Cl. .................. 260/29.2 TN; 260/9; 260/17.3; 260/29.4 R; 252/312; 260/37 N; 428/321; 428/425; 521/137; 521/159; 528/59; 528/76
[58] Field of Search .................. 260/29.2 TN

[56] References Cited

U.S. PATENT DOCUMENTS

| | | | |
|---|---|---|---|
| 2,948,691 | 8/1960 | Windemuta et al. | 260/29.2 TN |
| 3,061,470 | 10/1962 | Kuemmerer | 260/29.2 TN |
| 3,763,070 | 10/1973 | Shearing | 260/29.2 TN |
| 3,894,131 | 7/1975 | Speech | 260/29.2 TN |
| 3,897,581 | 7/1975 | Nakatsuka et al. | 260/29.2 TN |
| 3,996,154 | 12/1976 | Johnson et al. | 260/29.2 TN |

*Primary Examiner*—John C. Bleutge
*Assistant Examiner*—Arthur H. Koeckert
*Attorney, Agent, or Firm*—Denis A. Firth; John Kekich

[57] ABSTRACT

Storage stable aqueous solutions derived from polymethylene polyphenyl polyisocyanates are described, which solutions are useful as sealant coating compositions for wood and other substrates and, in the form of emulsions with polyisocyanates, as improved particle board binders. The storage stable aqueous solutions are obtained by admixing polymethylene polyphenyl polyisocyanates with less than a stoichiometric amount of a polyethylene glycol (MW 600 to 3000) or polypropylene glycol tipped with 15 to 85 percent ethylene oxide (MW 1000 to 3500) and, within a short time of completing the admixture but during the period where said mixture is completely soluble in water, dissolving said mixture in water. Optionally, a difunctional extender is added to the resulting solution in amount less than that required to react with all the isocyanate groups.

12 Claims, No Drawings

NOVEL COMPOSITIONS

BACKGROUND OF THE INVENTION

1. Field of the Invention

This invention relates to storage stable compositions derived from polyisocyanates and is more particularly concerned with storage stable aqueous solutions derived from polyisocyanates and with processes for their preparation and with uses thereof.

2. Description of the Prior Art

A variety of aqueous compositions derived from polyisocyanates is known in the art. Illustratively, aqueous emulsions, derived from polyisocyanates having all the isocyanate groups blocked by capping agents such as phenol, are described in U.S. Pat. Nos. 3,499,824; 3,933,677; 3,996,154 and 3,997,592. Water soluble solutions of the bisulfite complexes of blocked polyisocyanates and bisulfite-blocked isocyanate-terminated prepolymers are described in U.S. Pat. Nos. 3,483,189 and 3,984,365, respectively. Aqueous emulsions derived from solutions of polyisocyanates in dimethylformamide and like alkylated amides are described in U.S. Pat. No. 3,428,592.

U.S. Pat. No. 3,410,817 describes a polyurethane latex obtained by making an aqueous emulsion of an isocyanate-terminated prepolymer (optionally in the presence of a chain extender) and then precipitating the emulsion by addition of an alcohol.

U.S. Pat. No. 3,897,581 relates to the use of certain isocyanate-terminated prepolymers as water-curable adhesives for bonding of plywood and the like. Certain of the isocyanate-terminated prepolymers specifically described and exemplified are said to be soluble in water and to react therewith.

We have now found that novel homogeneous aqueous solutions, having prolonged stability on storage and having certain highly useful properties to be described hereafter, can be prepared in a manner not hitherto described.

SUMMARY OF THE INVENTION

This invention comprises storage stable aqueous solutions which comprise the product obtained by admixing at a temperature in the range of 25° C. to 100° C. (a) a polyether glycol selected from the group consisting of polyethylene glycols having a molecular weight from 600 to 3000 and polypropylene glycols capped with from 15 to 85 percent by weight of ethylene oxide and having a molecular weight from 1000 to 3500 with (b) a mixture of polymethylene polyphenyl polyisocyanates containing from 25 to 90 percent by weight of methylenebis(phenyl isocyanate) the proportions of (a) and (b) being such that there are from 0.1 to 0.99 equivalents of polyol per equivalent of polyisocyanate, and, during the time when the product so obtained is still completely soluble in water, admixing said product with sufficient water to form a clear aqueous solution.

This invention also comprises the above products, which also contain an amount of a difunctional extender less than that required to react with all the free isocyanate groups theoretically remaining after the admixture of the polyisocyanate and the polyether glycol.

DETAILED DESCRIPTION OF THE INVENTION

This invention is based on the unexpected finding that, when certain organic polyisocyanates and certain polyether polyols are brought together in the manner hitherto employed to prepare an isocyanate-terminated prepolymer, there is a relatively short period, after the reactants have been brought together, in which the mixture of reactants will dissolve completely in water to give a clear solution which remains stable on storage for prolonged periods and which has been found to possess highly useful properties in a variety of different fields.

This finding appears to be confined to the product obtained by bringing together a very limited group of organic polyisocyanates and a very limited group of polyether polyols. The organic polyisocyanates in question are polymethylene polyphenyl polyisocyanates containing from about 25 to about 90 percent by weight of methylenebis(phenyl isocyanate) the remainder of said mixture being polymethylene polyphenyl polyisocyanates of functionality higher than 2.0. Such polyisocyanates and methods for their preparation are well-known in the art. These polyisocyanates can also be employed in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362.

Preferred polymethylene polyphenyl polyisocyanates are those which contain from about 35 to about 65 percent by weight of methylenebis(phenyl isocyanate). Particularly preferred are the polymethylene polyphenyl polyisocyanates which contain about 50 percent of methylenebis(phenyl isocyanate).

The polyether polyols which are employed in the preparation of the compositions of the invention are the polyether glycols defined hereinbefore. Preferred polyether polyols are polyethylene glycols having molecular weights of 1000 to 1400 and polypropylene glycols capped with about 45% by weight of ethylene oxide and having molecular weights of 2000 to 3000.

In preparing the compositions of the invention the polymethylene polyphenyl polyisocyanate (I) and the polyether glycol (II) are brought together in any order and advantageously with agitation. The proportion of polyisocyanate (I) to glycol (II) is advantageously within the range of 1.1 to 10 equivalents of polyisocyanate per equivalent of polyol and preferably is within the range of 2 to 5 equivalents of polyisocyanate per equivalent of polyol.

The admixture of polyisocyanate (I) and polyol (II) can be carried out at ambient temperature (25° C.) but is advantageously carried out at slightly elevated temperatures within the range of 35° C. to 100° C. and preferably within the range of about 55° C. to about 65° C. The admixture is generally carried out under an inert atmosphere such as nitrogen and with exclusion of moisture.

The conditions described above for the admixture of the polyisocyanate (I) and polyol (II) generally follow those commonly employed in the preparation of isocyanate-terminated prepolymers. However, in the case of the preparation of the isocyanate-terminated prepolymer the reaction between the polyol and polyisocyanate is generally allowed to proceed to completion, i.e. until there is no further fall in isocyanate content, and the resulting product is generally of relatively high molecular weight and viscosity. In contrast, in the present instance, the mixture of polyisocyanate (I) and glycol (II) is only allowed to remain as such for a very short period after the bringing together of the two components has been completed. Thus, it has been found that, within a short period after admixture is complete, said period varying from a few minutes to two hours depending upon the particular components employed, the mixture is completely miscible with water to form a clear solution. In most instances this period of water miscibility is not very long and when the period has been exceeded the mixture of polyisocyanate and polyol no longer dissolves in water but reacts with the water to yield a foam.

The point at which any given mixture of polyisocyanate (I) and glycol (II) first becomes completely miscible with water, and the duration of this period of water miscibility, vary greatly depending upon the nature of the two components. In general, it is found that, as the molecular weight of the glycol increases, the time of onset of the water miscibility, after admixture of polyisocyanate and glycol is complete, becomes somewhat longer but the duration of the period of water miscibility is markedly increased. The time of onset and duration of the period of water miscibility can be determined readily by a process of trial and error in any given instance.

While it is surprising to find this phenomenon of water miscibility in the newly admixed polyisocyanate (I) and glycol (II), it is even more surprising to find that the aqueous solutions derived by dissolving the mixture of polyisocyanate and glycol are stable on storage and are possessed of highly useful properties. The proportion in which the mixture of polyisocyanate (I) and glycol (II) is combined with water can vary over a wide range. Advantageously, the proportion is within the range of about 1 to about 20 parts by weight of mixture per 100 parts by weight of water. Preferably the proportion is within the range of about 10 to about 15 parts by weight of mixture per 100 parts by weight of water.

There is no outward sign, such as evolution of gas, of any reaction between the free isocyanate groups in the mixture of polyisocyanate (I) and glycol (II) at the instant of mixing the latter with water. However, there is a very slow evolution of gas beginning a few seconds after the mixture of polyisocyanate (I) and glycol (II) are blended with the water that continues for approximately 4 hours, presumably with the formation of ureas and/or amines. The exact nature of the reaction which takes place after the mixture of polyisocyanate (I) and glycol (II) are brought together is not known nor is the precise composition of the stable aqueous solution formed in accordance with the invention known with certainty.

The aqueous solutions which are obtained in accordance with the above procedures are amber colored, low viscosity (10 to 1000 cps.) fluids which show no visible sign of change and no tendency to deposit solids on storage for prolonged periods. These liquids can be used to coat porous substrates such as wood, stone, cement, and the like and form a hard, tough film thereon which acts as a sealant and protectant. Surprisingly it is found that the films so produced are no longer soluble in water or in polar organic solvents and will accordingly remain highly resistant to weathering.

The aqueous solutions produced in accordance with the invention can also be employed, in the form of an emulsion with a polyisocyanate, such as the polymethylene polyphenyl polyisocyanates from which the compositions of the invention are derived, as a binder for particle board and the like. The properties of the particle boards so prepared are markedly superior to those obtained using as the binder only the polyisocyanate without the addition of the solutions of this invention.

The solutions of the invention can also be used to improve the structural properties of concrete by employing said solutions as part, or the whole, of the water employed in mixing the concrete.

In a particular embodiment of the process of the invention there is included in the water used to dissolve the mixture of polyisocyanate (I) and glycol (II), or there is added to the solution so obtained, a minor amount of a polyfunctional extender. Advantageously, the said extender is employed in an amount which corresponds to about 0.01 to about 0.5 equivalents per equivalent of polyisocyanate employed in the original mixture of polyisocyanate (I) and glycol (II). Preferably the amount of polyfunctional extender employed is within the range of about 0.1 to about 0.3 equivalents per equivalent of polyisocyanate originally employed.

The introduction of the extender in the above manner and in the above amounts does not affect the storage stability of the aqueous solution in any manner but does enhance the properties of the various products obtained from the aqueous solutions of the invention as discussed above.

Any of the di- and polyfunctional extenders known in the art can be employed for the above purpose. Illustratively said extenders include polyamines, polyhydric alcohols, amino alcohols and the like having equivalent weights up to about 500 such as ethylene diamine, trimethylenediamine, hexamethylenediamine, 1,3-butanediamine, cyclohexanediamine, di(aminocyclohexyl)methane, di(aminophenyl)methane, polymethylene polyphenyl polyamines, phenylenediamine, toluenediamine, 1,4-diethylbenzene-$\beta,\beta'$-diamine, 1,4-dipropylbenzene-$\gamma,\gamma'$-diamine, tri(aminophenyl)methane, ethylene glycol, propylene glycol, dipropylene glycol, butane-1,4-diol, glycerol, pentaerythritol, hydroquinone di(2-hydroxyethyl)ether, resorcinol di(2-hydroxyethyl)ether, diethanolamine, dipropanolamine, ethanolamine and the like. A preferred class of extenders are the aliphatic polyamines of which hexamethylenediamine is representative.

The following examples describe the manner and process of making and using the invention and set forth the best mode contemplated by the inventors of carrying out the invention but are not to be construed as limiting.

EXAMPLE 1

A total of 336.5 g. (2.53 equivalents) of a polymethylene polyphenyl polyisocyanate containing approximately 60 percent of methylenebis(phenyl isocyanate) [isocyanate equivalent = 133; viscosity 80 cps. at 25° C.] was charged to a reaction kettle and stirred under an atmosphere of nitrogen while the temperature of the kettle and contents was raised to 60° C. To the isocyanate was added rapidly, with stirring, over a period of 5 minutes, a total of 500 g. (1 equivalent) of Carbowax 1000 (a polyethylene glycol of molecular weight 1000; Union Carbide Corporation). The temperature was maintained at 60 ± 5° C. during the addition. After the addition was complete, the mixture was maintained at the same temperature with stirring and aliquots were removed at approximately 5 minute intervals and mixed with approximately 6 times their volume of water. It was found that the early aliquots gave milky fluids but that, at approximately 45 minutes after the admixture of polyisocyanate and glycol was completed, the aliquot gave a clear solution in water. Subsequent aliquots also gave clear solutions until 60 minutes after the admixture of polyisocyanate and glycol. Thereafter the aliquots reacted with the water and gave foams.

The above experiment was repeated and, approximately 50 minutes after the admixture of polyisocyanate and glycol was completed, the mixture was added to water (at the rate of 100 ml. of water per 15 g. of mixture) with stirring. The clear amber colored solution so obtained showed no tendency to deposit solids even after 8 months of storage at room temperature (approximately 20° C.). This solution is referred to hereinafter as *Solution A*.

The above experiment was repeated but increasing the proportion of polymethylene polyphenyl polyisocyanate to 572 g. (4.3 equivalents). It was found that for a period of 10 minutes, between 40 and 50 minutes after admixture of the polyisocyanate and glycol was complete, the product was miscible with water but gave opaque rather than clear solutions.

Similarly, repeating the above experiment but replacing the Carbowax 1000 by an equivalent quantity of Carbowax 600 (polyethylene glycol of molecular weight 600; Union Carbide Corporation) gave a mixture which was partially, but not completely, soluble in water for a period of 10 to 20 minutes after admixture of the polyisocyanate and glycol was complete.

EXAMPLE 2

Using the procedure exactly as described in Example 1 with the sole exception that the Carbowax 1000 was replaced by an equivalent amount of Poly G-427 (a polypropylene glycol capped with 45 percent by weight of ethylene oxide; molecular weight 2000; Olin Corporation), there was obtained a mixture of polyisocyanate and glycol which, beginning at 35 minutes after addition of the polyol was complete and continuing for approximately 85 minutes thereafter, was completely soluble in about 6 times its own volume of water to give clear amber colored solutions. A solution prepared in this manner in a repeat experiment is referred to hereinafter as *Solution B*.

Repeating the above experiment but replacing the Poly G-427 by an equivalent amount of Poly G-433 (a polypropylene glycol capped with 45 percent by weight of ethylene oxide and having a molecular weight of 1300; Olin Corporation) there was obtained a product which gave emulsions but not clear solutions when added to water during a period from 35 to 120 minutes after addition of the glycol to polyisocyanate was complete.

Similarly, repeating the above described experiment but replacing the Poly G-427 by an equivalent amount of Poly G-423 (a polypropylene glycol capped with 11 percent by weight of ethylene oxide; molecular weight 2000; Olin Corporation) it was found that admixture of polyisocyanate and polyol could not be accomplished because of lack of miscibility of one component with the other.

EXAMPLE 3

Using the procedure described in Example 1, but replacing the Carbowax 1000 there used by an equivalent amount of Carbowax 1540 (polyethylene glycol molecular weight 1400; Union Carbide Corporation), there was obtained a mixture which, beginning 40 minutes after admixture was complete and continuing until about 120 minutes after admixture was complete, dissolved completely in water to give a clear amber-colored solution.

In contrast, using the procedure of Example 1, but replacing the Carbowax 1000 by an equivalent amount of Carbowax 1540 and increasing the amount of polymethylene polyphenyl polyisocyanate to 572 g. (4.3 equivalents) there was obtained a mixture which, beginning at about 30 minutes after admixture was complete and continuing for the next 90 minutes thereafter, formed an emulsion on admixture with water in the proportion of 100 ml. of water per 15 g. of mixture. However, increasing the proportion of water to about 225 ml. of water per 15 g. of mixture gave a clear solution.

EXAMPLE 4

Using the procedure described in Example 1, but replacing the Carbowax 1000 there used by an equivalent amount of a polypropylene glycol capped with 45 percent by weight of ethylene oxide and having a molecular weight of 3000, there was obtained a mixture which, beginning about 60 minutes after admixture was complete and continuing for about 60 minutes thereafter, was completely soluble in about 6 times its volume of water to give a clear amber-colored solution.

Repetition of the above experiment but replacing the glycol with an equivalent amount of a polyoxypropylene glycol capped with 45 percent of ethylene oxide and having a molecular weight of 4000 gave a mixture which was not completely soluble in water at any time after admixture was complete.

Similarly, repeating the above experiment but replacing the ethylene oxide capped polypropylene glycol with an equivalent amount of Carbowax 4000 (polyethylene glycol of molecular weight 4000; Union Carbide Corporation), there was obtained a mixture which was highly viscous and reacted with water to yield a foam. At no time after admixture was the product soluble in water.

EXAMPLE 5

Using the procedure described in Example 1, but replacing the polymethylene polyphenyl polyisocyanate there used by 354.2 g. (2.53 equivalents) of a polymethylene polyphenyl polyisocyanate containing approximately 35 percent by weight of methylenebis(phenyl isocyanate) and having an isocyanate equivalent of 140, there was obtained a mixture which, beginning about 10 minutes after admixture was complete and continuing for approximately the next 20 minutes, was completely soluble in about 6 times its own volume of water to give clear amber-colored solutions. A solution prepared in this manner in a repeat experiment is referred to hereinafter as *Solution C*.

EXAMPLE 6

Using the procedure described in Example 1, but replacing the polymethylene polyphenyl polyisocyanate by an equivalent amount of 4,4'-methylenebis(phenyl isocyanate) there was obtained a mixture which produced foams on contacting with water and which did not dissolve in water at any time after admixture was complete.

EXAMPLE 7

Using the procedure described in Example 1, but replacing the Carbowax 1000 there used by an equivalent amount of PPG-1025 (polypropylene glycol; molecular weight = 1025), there was obtained a mixture which did not dissolve in water at any time after admixture was complete.

EXAMPLE 8

Using the procedure described in Example 1, but reducing the amount of polymethylene polyphenyl polyisocyanate to 314 g. (2.36 equivs.), there was obtained a mixture of polyisocyanate and glycol which exhibited complete solubility in water within the period of about 25 to about 85 minutes after admixture was complete. The bulk of the mixture was dissolved in water, at the rate of 15 parts by weight of mixture per 100 parts by weight of water, at about 80 minutes after admixture of the isocyanate and glycol was complete. The clear, amber-colored solution so obtained is referred to hereinafter as *Solution D*.

EXAMPLE 9

The procedure described for the preparation of Solution A in Example 1 was repeated exactly as described with the sole exception that 11.6 g. (0.2 equivs.) of hexamethylenediamine was added to the water used to prepare the final solution. The clear amber-colored solution showed no sign of deposition of solid or any other evidence of reaction or change after 7 months of storage. This solution is referred to hereinafter as *Solution E*.

EXAMPLE 10

Films were cast from samples of the solutions identified as Solutions A (Example 1), B (Example 2), C (Example 5), and D (Example A). In each case the film was cast by pouring the solution sample into an open steel mold having a mold cavity of 6" × 6" × ⅛" previously coated with carnauba wax (a mold release agent). After pouring the solution, the water therein was allowed to evaporate in air and the residue was cured by heating at 160° C. for 1 hour. Both before and after heat curing, the various films were all found to be insoluble in water, dimethylformamide and dimethylsulfoxide. Each of the films was subjected to testing for structural strength and the properties so determined are shown in Table I.

TABLE I

| Solution used to prepare film: | A | B | C | D |
|---|---|---|---|---|
| Modulus, psi: | | | | |
| at 50% elongation | 160 | 140 | 420 | 140 |
| 100% elongation | 310 | 290 | 990 | 270 |
| 200% elongation | 530 | N.T. | N.T. | 580 |
| Tensile strength, psi: | 570 | 390 | 1060 | 570 |
| Elongation %: | 210 | 150 | 120 | 210 |
| Die C Tear Strength, pli: | 96 | 65 | 90 | 82 |
| Tg. (glass transition temp.) | −40° C | N.T. | −28° C | −33° C |

(N.T. = not tested)

EXAMPLE 11

Using the procedure described in Example 10, films were cast, in a side by side comparison, from samples of Solution A (Example 1) and Solution E (Example 9). The only difference between the two solutions is the use of hexamethylenediamine in preparing Solution E. The films so obtained were insoluble in water and polar solvents (dimethylformamide, dimethylsulfoxide) both before and after heat curing. The physical properties of the films are shown in Table II.

TABLE II

| Solution used to prepare film: | A | E |
|---|---|---|
| Modulus, psi: | | |
| at 50% elongation | 190 | 610 |
| 100% elongation | 430 | 840 |
| Tensile strength, psi: | 650 | 980 |
| Elongation at break, %: | 150 | 140 |
| Tear Strength, pli | | |
| Die C: | 55.4 | 141.4 |

It will be seen that Solution E gave rise to a film having superior physical properties to that produced under identical conditions from Solution A.

EXAMPLE 12

A sample of particle board (Board X) was prepared by mixing 100 parts by weight of wood chips intimately with an emulsion prepared from 5 parts by weight of the polymethylene polyphenyl polyisocyanate employed as starting material in Example 1 and 5 parts by weight of a solution prepared from the same polyisocyanate and Carbowax 1540 as described in Example 3 and containing 12 percent by weight of solids.

The mixture of wood particles and binder was placed in a mold (5" × 5" × 2") and pressed at 1000 psi and 300° F. for 4 minutes. A second particle board (Board Y) was prepared in exactly the same manner but using as binder 10 parts by weight of the polyisocyanate employed as starting material in Example 1 in place of the emulsion of two components used to prepare the first board.

The properties of these two boards and those of a commercially available board prepared using a urea-formaldehyde resin binder are set forth in Table III.

TABLE III

| | Commercial Board | Board X | Board Y |
|---|---|---|---|
| Density pcf | 50.2 | 56.3 | 53.7 |
| Flexural strength psi | 2760 | 4700 | 4170 |
| Flexural modulus, psi | 300,000 | 600,000 | 500,000 |
| Volume change after 7 days at 25° C in water: | +12 | +11 | +10 |
| Volume change after 6 hours in boiling water: | Fell apart after 1.5 hr. | +12 | N.T. |

We claim:

1. A storage stable aqueous solution comprising the product obtained by admixing at a temperature in the range of 25° C. to 100° C. (a) a polyether glycol selected from the group consisting of polyethylene glycols having a molecular weight from 600 to 3000 and polypropylene glycols capped with from 15 to 85 percent by weight of ethylene oxide and having a molecular weight from 1000 to 3500, with (b) a mixture of polymethylene polyphenyl polyisocyanate containing from 25 to 90 percent by weight of methylenebis(phenyl isocyanates), the remainder of said mixture being polymethylene polyphenyl polyisocyanates of functionality higher than 2.0, the proportions of (a) and (b) being such that there are from 0.1 to 0.99 equivalents of polyol per equivalent of polyisocyanate, and, during the time when the product so obtained is completely soluble in water, admixing said product with sufficient water to form a clear aqueous solution.

2. A storage-stable aqueous solution according to claim 1 wherein an amount of an extender less than that required to react with all the free isocyanate groups is incorporated into the final aqueous solution.

3. A storage-stable aqueous solution according to claim 2 wherein the extender is hexamethylenediamine.

4. A storage-stable aqueous solution according to claim 1 wherein the amount of water employed in parts by weight is from five to ten times the combined weight of polyether glycol and polyisocyanate.

5. A storage-stable aqueous solution according to claim 1 wherein the polyisocyanate contains approximately 60 percent by weight of methylenebis(phenyl isocyanate) the remainder of said mixture being polymethylene polyphenyl polyisocyanates of higher functionality.

6. A storage-stable aqueous solution according to claim 1 wherein the polyisocyanate contains about 35 percent by weight of methylenebis(phenyl isocyanate) the remainder of said mixture being polymethylene polyphenyl polyisocyanates of higher functionality.

7. A storage-stable aqueous solution comprising the product obtained by admixing, at a temperature in the range of about 25° C. to about 100° C., (i) a polyethylene glycol having a molecular weight from 600 to 3000 with (ii) from 2 to 5 equivalents, per equivalent of said glycol, of a polymethylene polyphenyl polyisocyanate containing from 25 to 90 percent by weight of methylenebis(phenyl isocyanate), the remainder of said mixture being polymethylene polyphenyl polyisocyanates of functionality higher than 2.0, and, during the time when said admixture is completely soluble in water, dissolving said product in sufficient water to form a clear aqueous solution.

8. A storage-stable aqueous solution according to claim 7 wherein the water employed to prepare the solution also contains from 0.01 to 0.5 equivalents, per equivalent of polyethylene glycol, of hexamethylenediamine.

9. A storage-stable aqueous solution comprising the product obtained by admixing, at a temperature in the range of about 25° C. to about 100° C., (i) a polypropylene glycol capped with from 15 to 85 percent by weight of ethylene oxide and having a molecular weight from 1000 to 3500 with (ii) from 2 to 5 equivalents, per equivalent of said glycol, of a polymethylene polyphenyl polyisocyanate containing from 25 to 90 percent by weight of methylenebis(phenyl isocyanate), the remainder of said mixture being polymethylene polyphenyl polyisocyanates of functionality higher than 2.0, and, during the time when said admixture is completely soluble in water, dissolving said product in sufficient water to form a clear aqueous solution.

10. A storage-stable aqueous solution according to claim 9 wherein the water employed to prepare the solution also contains from 0.01 to 0.2 equivalents, per equivalent of polyisocyanate, of hexamethylenediamine.

11. A process for sealing the surface of a porous substrate which comprises applying to said substrate a composition according to claim 1.

12. A particle board binder composition which comprises an emulsion derived from a polymethylene polyphenyl polyisocyanate and a composition according to claim 1.

* * * * *